US010910179B2

(12) United States Patent
Malakhovskiy et al.

(10) Patent No.: US 10,910,179 B2
(45) Date of Patent: Feb. 2, 2021

(54) VACUUM CIRCUIT BREAKER WITH IMPROVED CONFIGURATION

(71) Applicant: TAVRIDA ELECTRIC HOLDING AG, Cham (CH)

(72) Inventors: Sergey Ivanovich Malakhovskiy, Chernogolovka (RU); Vladimir Sergeevich Minaev, Chernogolovka (RU)

(73) Assignee: TAVRIDA ELECTRIC HOLDING AG, Cham (CH)

( * ) Notice: Subject to any disclaimer, the term of this patent is extended or adjusted under 35 U.S.C. 154(b) by 0 days.

(21) Appl. No.: 16/610,885

(22) PCT Filed: May 3, 2018

(86) PCT No.: PCT/EP2018/061432
§ 371 (c)(1),
(2) Date: Nov. 4, 2019

(87) PCT Pub. No.: WO2018/202817
PCT Pub. Date: Nov. 8, 2018

(65) Prior Publication Data
US 2020/0075276 A1 Mar. 5, 2020

(30) Foreign Application Priority Data

May 3, 2017 (GB) .................................. 1707027.7

(51) Int. Cl.
*H01H 33/66* (2006.01)
*H01H 33/662* (2006.01)
*H01H 33/666* (2006.01)

(52) U.S. Cl.
CPC ...... *H01H 33/6606* (2013.01); *H01H 33/666* (2013.01); *H01H 33/66207* (2013.01);
(Continued)

(58) Field of Classification Search
CPC ......... H01H 33/6606; H01H 33/66207; H01H 33/662; H01H 33/66261; H01H 33/666;
(Continued)

(56) References Cited

U.S. PATENT DOCUMENTS 4,568,804 A 2/1986 Luehring
5,387,772 A * 2/1995 Bestel .............. H01H 33/66207
218/118

(Continued)

FOREIGN PATENT DOCUMENTS

EP        2 634 786 A1    9/2013
GB        2223357 A       4/1990
JP        2003 031091 A   1/2003

OTHER PUBLICATIONS

International Search Report for International Application No. PCT/EP2018/061432, dated Jul. 16, 2018, 5 pages.
(Continued)

*Primary Examiner* — William A Bolton
(74) *Attorney, Agent, or Firm* — Patterson Thuente Pedersen, PA

(57) ABSTRACT

A vacuum circuit breaker comprising a vacuum interrupter (12) coupled between upper (18) and lower (20) terminals and being operable to make or break an electrical connection between the upper and lower terminals. The circuit breaker has a body 22 formed from electrically insulating material, the vacuum interrupter being located in an internal chamber of the body. The circuit breaker body is arranged to provide an isosceles triangle between the upper (C) and lower (A) terminal connection interfaces. This allows the same design of both upper and lower external connectors 80, 82. A pulling rod (16) coupled to the vacuum interrupter comprises a core (70) of heat-resistant plastic co-moulded with a shell (72) formed from impact resistant plastic.

22 Claims, 4 Drawing Sheets

(52) U.S. Cl.
CPC ............... *H01H 33/66261* (2013.01); *H01H 2033/6623* (2013.01); *H01H 2033/66276* (2013.01)

(58) Field of Classification Search
CPC ........... H01H 33/66; H01H 2033/6623; H01H 2033/66667; H02B 11/00; H02B 11/02; H02B 11/06; H02B 13/025; H02B 13/035
USPC ............... 218/139, 134, 155, 118, 121, 122; 200/48 R, 144 B
See application file for complete search history.

(56) References Cited

U.S. PATENT DOCUMENTS

| | | | | |
|---|---|---|---|---|
| 5,585,611 A | * | 12/1996 | Harvey | H01H 33/027 218/134 |
| 5,597,992 A | * | 1/1997 | Walker | H01H 33/6606 218/121 |
| 6,107,592 A | * | 8/2000 | Morita | H01H 3/52 218/118 |
| 7,866,031 B2 | * | 1/2011 | Stoving | H01H 33/66207 218/118 |
| 8,674,254 B2 | * | 3/2014 | Borgstrom | H01H 33/42 218/136 |
| 9,336,960 B2 | * | 5/2016 | Gentsch | B29C 45/16 |
| 2004/0016721 A1 | | 1/2004 | Traska et al. | |
| 2004/0061589 A1 | | 4/2004 | Daharsh | |
| 2007/0278187 A1 | * | 12/2007 | Siebens | H01H 33/66207 218/118 |
| 2010/0170774 A1 | | 7/2010 | Einschenk | |

OTHER PUBLICATIONS

Written Opinion of the ISA for International Application No. PCT/EP2018/061432, dated Jul. 16, 2018, 7 pages.
GB Search Report for Application No. 1707027.7, dated Oct. 30, 2017, 1 page.

* cited by examiner

VACUUM CIRCUIT BREAKER WITH IMPROVED CONFIGURATION

RELATED APPLICATIONS

This application is a National Phase entry of PCT Application No. PCT/EP2017/061432 filed May 3, 2018, which application claims the benefit of priority to GB Application No. 1707027.7, filed May 3, 2017, the entire disclosures of which are incorporated herein by reference.

FIELD OF THE INVENTION

The present invention relates to vacuum circuit breakers.

BACKGROUND TO THE INVENTION

A vacuum circuit breaker (VCB) normally comprises a vacuum circuit interrupter and an actuator for operating the interrupter between open and closed states. Typically, the actuator comprises an electromagnetic device coupled to the contacts of the interrupter.

Conventional VCBs are considered to be relatively large and relatively expensive to manufacture.

It would be desirable to provide an improved vacuum circuit breaker.

SUMMARY OF THE INVENTION

A first aspect of the invention provides a vacuum circuit breaker comprising:
a first terminal;
a second terminal;
a vacuum interrupter coupled between said first and second terminals and being operable to make or break an electrical connection between said first and second terminals; and
a body formed from electrically insulating material and being shaped to define an internal chamber,
wherein said first and second terminals are supported by said body, and said vacuum interrupter is located in said internal chamber,
and wherein the second terminal comprises a hollow body that forms part of said internal chamber and which is shaped and dimensioned to allow the vacuum interrupter to pass through it.

A second aspect of the invention provides a vacuum circuit breaker comprising:
a first terminal;
a second terminal;
a vacuum interrupter coupled between said first and second terminals and being operable to make or break an electrical connection between said first and second terminals; and
a body formed from electrically insulating material and being shaped to define an internal chamber,
wherein said first and second terminals are supported by said body, and said vacuum interrupter is located in said internal chamber, wherein the first terminal is located at the top of the body and provides a first electrical connection interface at the top of the body, preferably on the pole axis of the body, the second terminal including a stem projecting from said hollow body and projecting obliquely, preferably perpendicularly, from the pole axis to provide a second electrical connection interface that is laterally displaced from the pole axis, and wherein a notional perpendicular axis from the second electrical connection interface to the pole axis intersects the pole axis at a notional intersection point, the configuration of the circuit breaker being such that a notional triangle created by said first and second electrical connection interfaces and said notional intersection point is an isosceles right triangle, where a notional line between said first and second electrical connection interfaces forms the hypotenuse of the triangle.

A third aspect of the invention provides a vacuum circuit breaker comprising:
a first terminal;
a second terminal;
a vacuum interrupter coupled between said first and second terminals and being operable to make or break an electrical connection between said first and second terminals; and
a body formed from electrically insulating material and being shaped to define an internal chamber,
wherein said first and second terminals are supported by said body, and said vacuum interrupter is located in said internal chamber, wherein the first terminal is located at the top of the body and provides a first electrical connection interface at the top of the body, preferably on the pole axis of the body, the second terminal including a stem projecting from said hollow body and projecting obliquely, preferably perpendicularly, from the pole axis to provide a second electrical connection interface that is laterally displaced from the pole axis, and wherein a first elongate external connector is connected to the first terminal at its connection interface, and a second elongate external connector is connected to the second terminal at its connection interface, wherein the external connectors extend parallel to each other but obliquely to the pole axis. In preferred embodiments a notional perpendicular axis from the second electrical connection interface to the pole axis intersects the pole axis at a notional intersection point, the configuration of the circuit breaker being such that a notional triangle created by said first and second electrical connection interfaces and said notional intersection point is an isosceles right triangle, where a notional line between said first and second electrical connection interfaces forms the hypotenuse of the triangle.

In preferred embodiments (of any aspect) said circuit breaker body is formed from a moldable material and wherein at least one of, and preferably each of, said first terminal and said second terminal are molded into said circuit breaker body. Preferably, the circuit breaker body is formed from plastic, preferably thermoplastic.

Advantageously, said hollow body has an annular internal surface that forms part of the internal surface of said internal chamber. Said annular internal surface of said hollow body may be flush or substantially flush with the internal surface of said circuit breaker body.

Typically, said first and second terminals are spaced apart along a pole axis of said circuit breaker body, said vacuum interrupter being at least partly located in a region of said internal chamber between said first and second terminals. the transverse cross-section of a region of said internal chamber defined by said second terminal is shaped and dimensioned to match the transverse cross-sectional shape and dimensions of transverse cross-section of said region in which the vacuum interrupter is at least partly located, or to define a space that is larger than the transverse cross-sectional shape and dimensions of region in which the vacuum interrupter is at least partly located.

Preferably a region of said internal chamber defined by said second terminal is shaped and dimensioned to match the transverse cross-sectional shape and dimensions of the vacuum interrupter, or to define a space that is larger than the transverse cross-sectional shape and dimensions of the vacuum interrupter.

Advantageously said circuit breaker body has an open end, said second terminal being located between said open end and said region in which said vacuum interrupter is at least partly located, said open end being shaped and dimensioned to allow said vacuum interrupter to pass through said open end.

Advantageously the internal chamber is shaped and dimensioned to allow passage of the vacuum interrupter along the internal chamber from an open end of the internal chamber to a desired location within the internal chamber.

Optionally an end of said vacuum interrupter is located within said hollow body.

Typical embodiments include an electrical connector device electrically connecting a movable contact of the vacuum interrupter to the second terminal, the electrical connector device being located within the internal chamber of the circuit breaker body, preferably within the hollow body of the second terminal. The internal chamber may be shaped and dimensioned to allow passage of the connector device along the internal chamber from an open end of the internal chamber to a desired location within the internal chamber.

Preferably a region of the internal chamber between the open end and a region defined by the second terminal is shaped and dimensioned to match the transverse cross-sectional shape and dimensions of the electrical connector device, and preferably also the vacuum interrupter, or to define a space that is larger than the transverse cross-sectional shape and dimensions of the electrical connector device, and preferably also of the vacuum interrupter.

Optionally said hollow body is cylindrical.

The internal chamber may be of substantially uniform transverse cross-section, at least in a region defined by said second terminal and region in which said vacuum interrupter is located.

The internal chamber may be of substantially cylindrical transverse cross-section.

In preferred embodiments the circuit breaker includes a pulling rod coupled to said vacuum interrupter for operation thereof, said pulling rod comprising a core located within a shell, the core being formed from heat-resistant material, preferably heat-resistant plastics, the shell being formed from impact resistant material, preferably impact-resistant plastics. Advantageously the core and the shell are formed from thermoplastics or thermosetting polymeric material.

Advantageously the core is formed from material, preferably moldable electrically insulating material, and most preferably plastics, having relatively high heat-resistance compared to the material from which the shell is formed, the shell being formed from material, preferably moldable electrically insulating material, and most preferably plastics, having relatively high impact-resistance compared to the material from which the core is formed.

Preferably the core and the shell are co-molded with one another.

Typically an end of said pulling rod is located within said hollow body.

In some embodiments the first terminal is located at the top of the body and provides a first electrical connection interface at the top of the body, preferably on the pole axis of the body, the second terminal including a stem projecting from said hollow body and projecting obliquely, preferably perpendicularly, from the pole axis to provide a second electrical connection interface that is laterally displaced from the pole axis, and wherein a notional perpendicular axis from the second electrical connection interface to the pole axis intersects the pole axis at a notional intersection point, the configuration of the circuit breaker being such that a notional triangle created by said first and second electrical connection interfaces and said notional intersection point is an isosceles right triangle, where a notional line between said first and second electrical connection interfaces forms the hypotenuse of the triangle.

Optionally the first terminal is located at the top of the body and provides a first electrical connection interface at the top of the body, preferably on the pole axis of the body, the second terminal including a stem projecting from said hollow body and projecting obliquely, preferably perpendicularly, from the pole axis to provide a second electrical connection interface that is laterally displaced from the pole axis, and wherein a first elongate external connector is connected to the first terminal at its connection interface, and a second elongate external connector is connected to the second terminal at its connection interface, wherein the external connectors extend parallel to each other but obliquely to the pole axis.

Advantageously the external connectors are of the same length.

A fourth aspect of the invention provides a pulling rod for a vacuum interrupter, said pulling rod comprising a core located within a shell, the core being formed from heat-resistant material, preferably heat-resistant plastics, the shell being formed from impact resistant material, preferably impact-resistant plastics. Preferably the core and the shell are formed from thermoplastics or thermosetting polymeric material.

In some embodiments, reduced weight and size characteristics of an indoor switching module can be achieved due to the design of the circuit breaker support insulation and its method of manufacture.

Preferred embodiments of the invention include support insulation made from electrically insulating material, for example thermoplastic material, into which the lower and upper terminals of the circuit breaker are incorporated, preferably by molding.

Advantageously, the lower terminal is annular in design.

Advantageously, the pole axis is inclined with respect to a notional inter-terminal axis extending between a respective reference point on each of the upper lower terminals, preferably such that the pole axis, said notional inter-terminal axis, and a lower terminal axis intersect to form a right isosceles triangle.

Preferred embodiments of the invention are able to provide a circuit breaker with relatively small dimensions for given current and insulation ratings, or a circuit breaker with relatively high current and insulation ratings for given dimensions.

Preferred embodiments facilitate a relatively low manufacturing cost for the circuit breaker.

Advantageously, the dimensions of a draw-out unit based on preferred circuit breakers embodying the invention are relatively small in comparison with conventional circuit breakers.

Advantageously, the cost of a draw-out unit based on preferred circuit breakers embodying the invention are relatively low in comparison with conventional circuit breakers.

Preferred embodiments exhibit an increased thermal stability and durability of the pulling rod insulator in comparison with conventional circuit breakers.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figures 1, 1A, 1B:
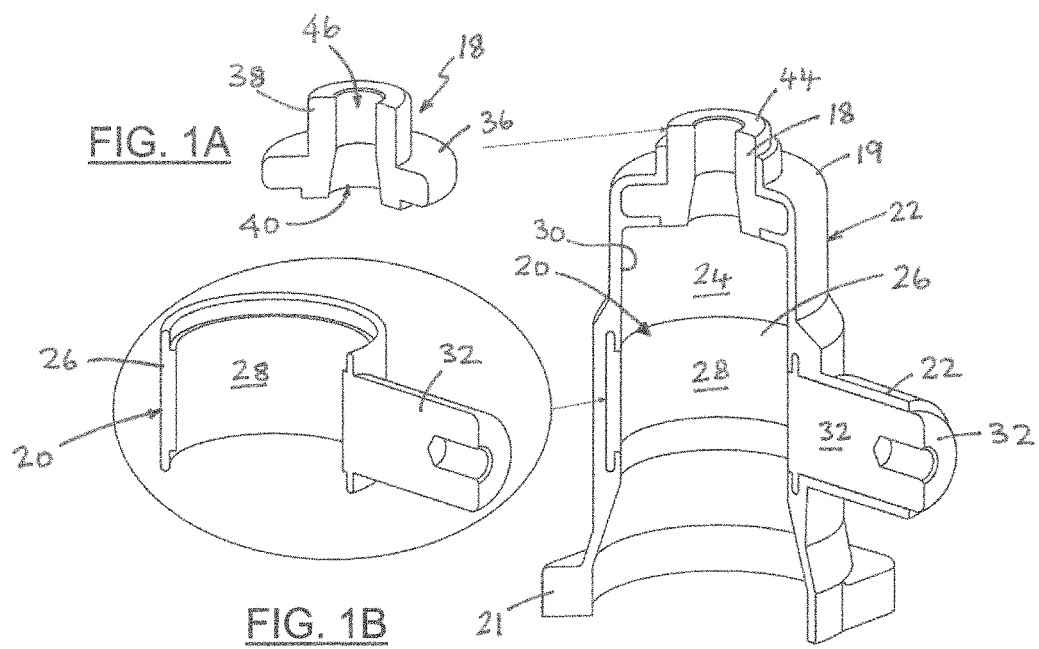
FIG. 1 is a cut-away perspective view of a body of a vacuum circuit breaker embodying the invention.
FIG. 1A is a cut-away perspective view of an upper electrical terminal included in the vacuum circuit breaker body of FIG. 1.
FIG. 1B is a cut-away perspective view of a lower electrical terminal included in the vacuum circuit breaker body of FIG. 1.

Referring now to the drawings there is shown, generally indicated as 10 an electrical circuit breaker. The circuit breaker 10 is particularly intended for use in breaking an AC electrical power supply and so may be referred to as an AC circuit breaker. The circuit breaker 10 comprises a vacuum interrupter 12 and as such may be referred to as a vacuum circuit breaker (VCB). The vacuum interrupter 12, which may also be referred to as a vacuum switching device, comprises a movable electrical contact (not visible) and a fixed (stationary) electrical contact (not visible) located in a vacuum chamber 14, i.e. a chamber that is hermetically sealed and in vacuum, at least during use. The movable contact is movable between an open state, in which it is electrically and physically separate from the fixed contact and a closed state in which it makes electrical (and typically physical) contact with the second contact. The open state of the movable contact corresponds to the open, or breaking, state of the vacuum interrupter 12 and correspondingly of the circuit breaker 10 in which it interrupts current flow in whatever circuit (not shown) it is part of. The closed state of the contact corresponds to the closed, or making, state of the vacuum interrupter 12 and correspondingly of the circuit breaker 10, in which current is able to flow between the fixed and movable contacts.

Movement of the contact between its open and closed states is effected by an actuator (not shown). The actuator may be of any suitable type, for example an electromagnetic actuator or any other mechanical, electrical or electromechanical actuator. The actuator is coupled to the movable contact of the vacuum interrupter 12 by a mechanical coupling mechanism, which in preferred embodiments comprises a pulling rod 16, in particular an electrically insulating pulling rod, although in alternative embodiments it may take any other suitable form, e.g. a bellows coupling. The coupling mechanism couples the actuator to the movable contact to allow the actuator to move the contact between its open and closed states.

The vacuum interrupter 12, and therefore the VCB 10, typically operates in a normally closed state, i.e. with the movable contact in its closed state to allow current to flow between the contacts and so to flow in any given circuit (not shown) in which the circuit breaker 10 is installed during use. In such cases the VCB 10 may be configured to open automatically in response to detection of a fault condition, e.g. in response to detection of a current overload or short circuit, to protect the circuit into which it is incorporated during use. It achieves this by causing the actuator to move the movable contact to its open state in response to detection of the fault. To this end the VCB 10 typically includes, or is co-operable with, a controller (not shown) for effecting the open state upon detection of a fault. The controller typically comprises electrical and/or electronic circuitry that includes, or is connected to, one or more current sensors (not shown). The current sensor(s) are coupled in use to any convenient current conductor of the VCB 10 or circuit to which the VCB is connected. Upon detection of current, more particularly prospective current, above a threshold level by the sensor(s), the controller causes the VCB to open. In some embodiments, the VCB 10 can be reset, i.e. closed, manually or semi-manually (e.g. by manual activation of a user control (not shown)) and/or automatically in response to the VCB 10 detecting that the fault has gone, and/or after a threshold period of time has expired since activation. Circuit breakers that reset automatically are commonly known as reclosers.

Referring in particular to FIGS. 1, 1A and 1B, the circuit breaker 10 includes a first, or upper, electrical terminal 18 and a second, or lower, electrical terminal 20 by which the circuit breaker 10 can be electrically connected, in use, to an external electrical circuit or device (not shown). The first terminal 18 is electrically connected to the fixed contact of the vacuum interrupter 12. The second terminal 20 is electrically connected to the movable contact of the vacuum interrupter 12. The terminals 18, 20 are formed from electrically conductive material, e.g. copper or other suitable metal or metal alloy.

The terminals 18, 20 are supported by and typically incorporated into a body 22 of the circuit breaker 10. The terminals 18, 20 are mutually spaced apart along the pole axis P of the circuit breaker 10 (which in typical embodiments corresponds to the direction along which the movable contact of the interrupter 12 moves, and the direction of movement of the pulling rod). The body 22 defines an internal chamber 24 for housing and supporting the vacuum interrupter 12 and other components of the circuit breaker 10 as is described in further detail hereinafter. Conveniently, the chamber 24 is substantially circular in transverse cross section (i.e. the cross section that is perpendicular with the pole axis), although it may alternatively take other cross-sectional shapes. Typically, the upper terminal 18 is located at a first end 19 (or top) of the body 22, and the lower terminal 20 is located between the first end 19 and a second end 21 (or bottom) of the body 22. Advantageously, the second end 21 is open to allow insertion of circuit breaker components into the chamber 24 as is described in more detail hereinafter.

The body 22 is formed from an electrically insulating material, typically a dielectric material. In preferred embodiments the body is formed from a moldable material. For example the body 22 may be formed from plastic, preferably from thermoplastic material (e.g. comprised of one or more thermoplastics). Alternatively the body 22 may be formed from one or more thermosetting polymer or any convenient electrically insulating material.

Advantageously, at least one, but preferably both, of the terminals 18, 20 is molded into the body 22, i.e. incorporated into the body 22 during formation of the body by molding. Any suitable conventional molding process can be used, for example injection molding. Advantageously, the terminals 18, 20 are incorporated into the body 22 such that at least some of, and preferably substantially all of, the external surfaces of the respective terminal 18, 20 are in contact with a respective internal surface of the body 22.

In preferred embodiments, the lower terminal 20 comprises a hollow annular body 26 that is preferably tubular in form, i.e. an open-ended sleeve-like structure. Typically, but not necessarily, the annular body 26 is substantially circular in transverse cross-section, i.e. the annular body 26 may be a hollow cylindrical structure. However, in alternative embodiments the annular body may have other (non-circular) cross-sectional shapes, preferably to match the shape of the chamber 24. The annular body 26 is typically rigid, being formed from metallic or other conductive material. The annular body 26 is incorporated into the circuit breaker body 22 such that the internal surface 28 of the annular body 26 provides part of the internal surface of the chamber 24. As such, the annular body 26 extends around the pole axis P. Preferably, the internal surface 28 of the annular body 26 is flush, or substantially flush, with the internal surface 30 of the chamber 24 that is provided by the body 22 itself. To this end, the annular body 26 may be provided in a recess formed in the body 22. The external surface of the annular body 26 is covered by the body 22. Advantageously, the annular body 26 is shaped and dimensioned to allow the vacuum interrupter to pass through it (i.e. the respective shapes and dimensions of the annular body 26 and the vacuum interrupter 12 are such that the vacuum interrupter is able to pass through the annular body 26, and therefore to pass through the lower terminal 20).

The lower terminal 20 typically also includes a connection stem 32. The connection stem 32 is conveniently integrally formed with the annular body 26 but may otherwise be connected (at least electrically) to it. The connection stem 32 is typically rigid, being formed from metallic or other conductive material. The connection stem 32 extends from the annular body 26 in a direction that is non-parallel with, and preferably substantially perpendicular to, the pole axis P. The circuit breaker body 22 is shaped to cover the outer surface of the stem 32 except for at an end 34, which is exposed to allow the stem 32, and therefore the terminal 20, to be connected to an external circuit or device. The end 34 of the stem 32 may be provided with a socket 35 or other suitable formation for this purpose.

The upper terminal 18 is typically located at the top end of the chamber 24 which conveniently corresponds to the top 19 of the circuit breaker body 22. The terminal 18 may comprise a body 36 and a connection stem 38. The body 36 may be annular, defining a socket 40 for receiving an electrical connector 42 to electrically connect the terminal 18 with the fixed contact of the vacuum interrupter 12. The connection stem 38 conveniently extends from the body 36 in a direction substantially parallel with the pole axis P. The body 36 and stem 38 are typically rigid, being formed from metallic or other conductive material. The circuit breaker body 22 is shaped to cover the outer surface of the stem 38 except for at an end 44, which is exposed to allow the stem 38, and therefore the terminal 18, to be connected to an external circuit or device. The end 44 of the stem 38 may be provided with a socket 46 or other suitable formation for this purpose. Advantageously, the upper terminal 18 screens the elements of the vacuum interrupter 12 with high electric field strength (e.g. triple points). It also facilitates reduction of the dimensions of the circuit breaker 10.

An electrical connector device 50 (sometimes referred to as a current pickup) is provided for electrically connecting the movable contact of the vacuum interrupter 12 to the lower terminal 20. The connector device 50 has a movable part 52 that is connected to the movable contact, and a fixed (stationary) part 54 that is connected to the lower terminal 20. The movable part 52 is connected to the fixed part 54 by at least one, but typically a plurality of, flexible connectors 56 that allow relative movement between the fixed and movable parts 52, 54. Typically, the fixed part 54 is annular and is located around the movable part 52. The fixed and movable parts 52, 54 and the flexible connectors 56 are formed form any suitable conductive material. In the illustrated embodiment, the movable part 52 has a socket 58 for engaging an electrical connector 60 of the vacuum interrupter 12, the connector 60 being electrically connected to the movable contact of the interrupter 12. When the connector 60 is engaged with the movable part 52, the electrical connection device 50 electrically connects the movable contact of the interrupter to the lower terminal 20 while accommodating movement of the movable contact.

Figure 4:
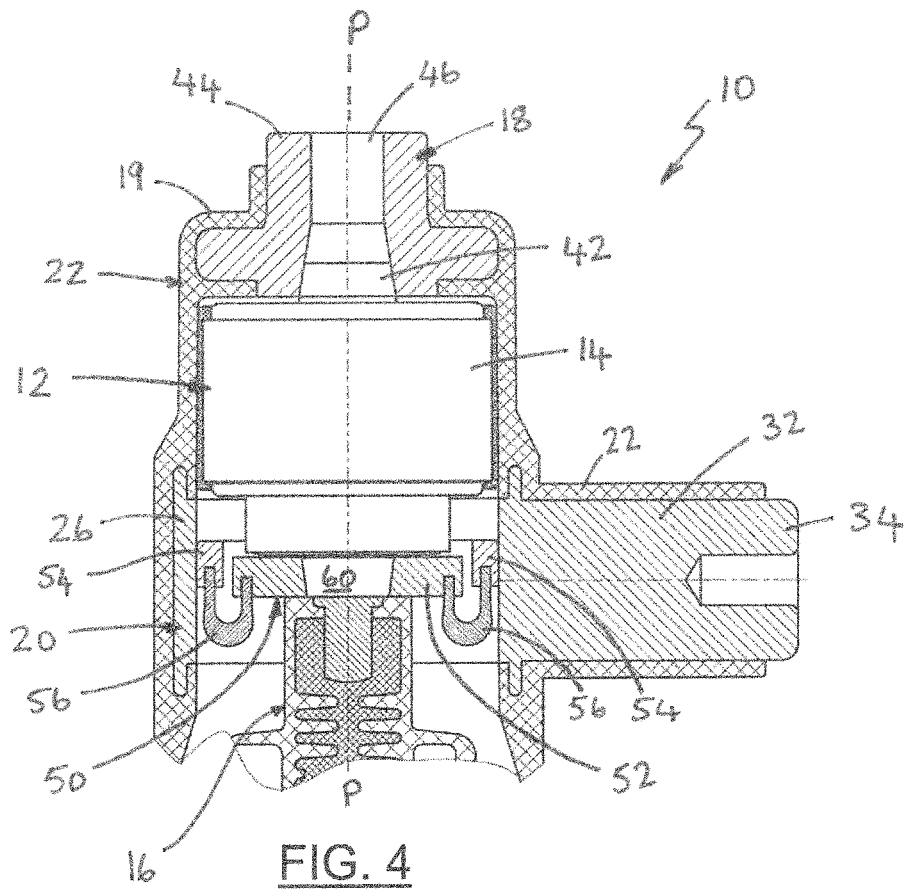
FIG. 4 is a sectioned side view of the vacuum circuit breaker.

In the illustrated embodiment, the pulling rod 16 is mechanically coupled to the movable contact via the electrical connector 60, as can best be seen from FIG. 4. In use, movement of the pulling rod 16 in the direction of the pole axis P causes a corresponding movement of the movable part 52 and of the movable contact.

Figure 2:
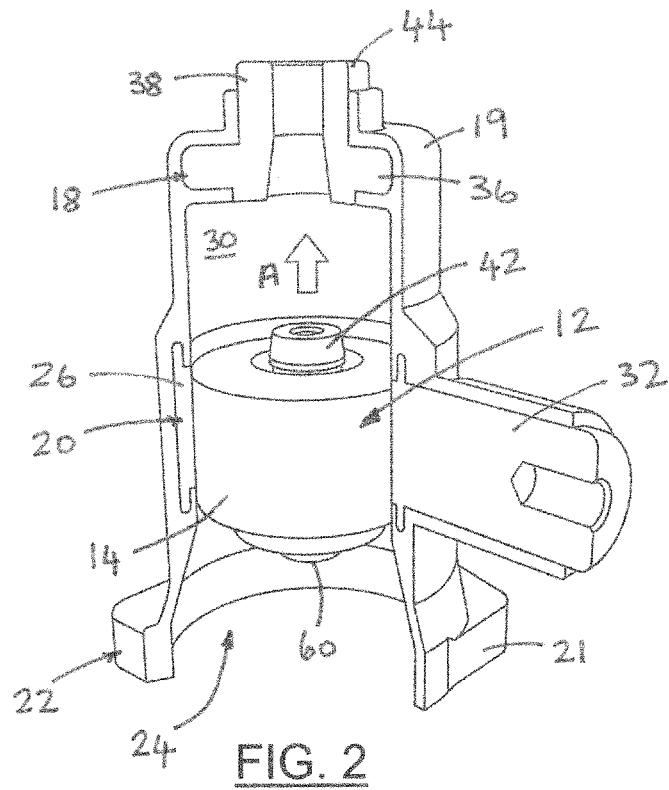
FIG. 2 is a cut-away perspective view of the vacuum circuit breaker body showing how a vacuum interrupter may be inserted into the body.
Figure 3:
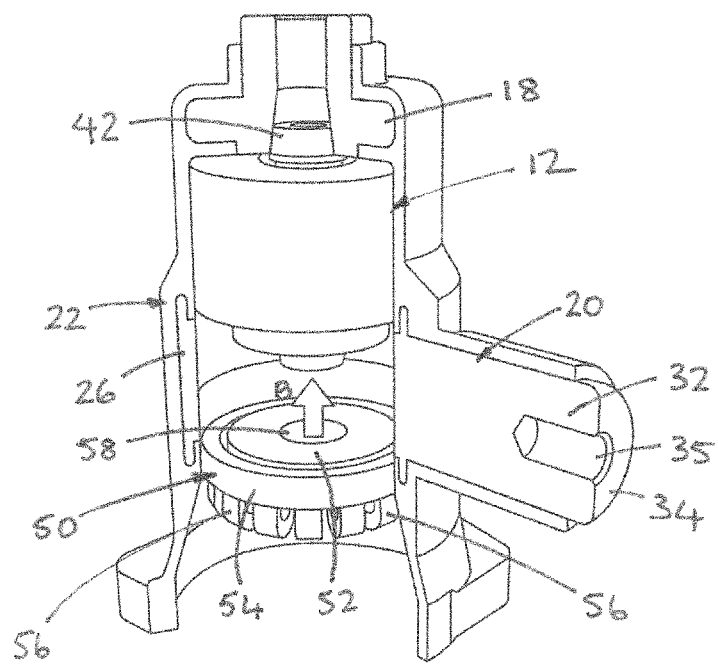
FIG. 3 is a cut-away perspective view of the vacuum circuit breaker body showing how a current pick-up unit may be inserted into the body.

Referring now in particular to FIGS. 2 and 3, it is shown how the circuit breaker 10 can readily be assembled, which simplifies the manufacturing process. FIG. 2 shows how the vacuum interrupter 12 can be inserted through the open end 21 of the circuit breaker body 22, through the annular body 26 of the lower terminal 20, and moved into engagement with the upper terminal 18 as indicated by arrow A. In this position the connector 42 of the vacuum interrupter 12 engages with the socket 40 to electrically connect the fixed contact to the terminal 18. FIG. 3 shows how the electrical connector device 50 can be inserted through the open end 21 of the circuit breaker body 22, into the annular body 26 of the lower terminal 20, and moved into engagement with the vacuum interrupter 12 as indicated by arrow B.

The chamber 24 is shaped and dimensioned to receive the vacuum interrupter 12, preferably providing an interference fit (also known as a friction fit or press fit) between the interrupter 12 and the internal surface of the chamber 24. In typical embodiments, the external shape of the vacuum interrupter is substantially cylindrical and so the internal surface of the chamber 24 may be correspondingly shaped, at least in the region where the vacuum interrupter 12 is located in use. The chamber 24 is also shaped and dimensioned to allow passage of the vacuum interrupter 12 (advantageously in its normal use orientation) along the chamber 24 from the chamber end 21 (which is open to allow insertion of the interrupter 12 and other components) to its desired location during assembly of the circuit breaker 10. Preferably, the chamber 24 is of substantially uniform transverse cross-section between its ends 19, 21, or at least between the lower terminal 20 and the upper terminal 18, typically being substantially cylindrical, although it could take other shapes in alternative embodiments. In particular it is preferred that the transverse cross-section of the chamber 24 is substantially uniform in the region of the lower terminal 20 and in the region between the lower terminal 20 and the upper terminal 18 where the vacuum interrupter 12 is located in use. More generally, the shape and dimensions of the transverse cross-section of the chamber 24 in the region defined by the lower terminal 20 are such that the vacuum interrupter 12 is able to pass through the region defined by the lower terminal 20 into the region between the lower terminal 20 and the upper terminal 18. To this end the region defined by the lower terminal 20 may be shaped and dimensioned (e.g. in transverse cross-section) to match the transverse cross-sectional shape and dimensions of the vacuum interrupter 12, or to define a space that is larger than the transverse cross-sectional shape and dimensions of the vacuum interrupter 12. One way to facilitate this is to make the chamber 24 cylindrical in transverse cross section, the vacuum interrupter typically also being cylindrical in transverse cross section. In the illustrated embodiment, the chamber 24 is uniformly cylindrical at least in the region of the lower terminal 20 and in the region between the lower terminal 20 and the upper terminal 18 where the vacuum interrupter 12 is located in use. Alternatively, the chamber 24 may be wider in the region of the lower terminal 20 than in the region between the lower terminal 20 and the upper terminal 18. Optionally, the chamber 24 is shaped to provide a flared region at its end 21 (which may extend to the region of the lower terminal 20), and the chamber 24 may have substantially uniform transverse cross section between the flared region and the other end 19.

The chamber 24 is shaped and dimensioned to receive the electrical connector device 50, preferably providing an interference fit (also known as a friction fit or press fit) between the fixed part 54 and the internal surface of the chamber 24. Advantageously, the electrical connector device 50 is located (when the circuit breaker 10 is assembled) within the annular body 26 of the lower terminal 20, and so the fixed part engages with the inside of the annular body 26 (which forms part of the chamber's internal surface). In typical embodiments, the external shape of the connector device 50 is substantially cylindrical and so the internal surface of the chamber 24 may be correspondingly shaped in the region of the annular body 26. The chamber 24 is also shaped and dimensioned to facilitate passage of the connector device 50 (advantageously in its normal use orientation) along the chamber 24 from the open chamber end 21 to its desired location during assembly of the circuit breaker 10. The shape and dimensions of the transverse cross-section of the chamber 24 from the open end 21 to the region defined by the lower terminal 20 are such that the electrical connector device 50 (and the vacuum interrupter 12) is able to pass through open end 21 to the region defined by the lower terminal 20. To this end the region between the open end 21 and the region defined by the lower terminal 20 may be shaped and dimensioned (e.g. in transverse cross-section) to match the transverse cross-sectional shape and dimensions of the electrical connector device 50 (and optionally the vacuum interrupter 12), or to define a space that is larger than the transverse cross-sectional shape and dimensions of the electrical connector device 50 (and the vacuum interrupter 12). In preferred embodiments, the shape and dimensions of the electrical connector device 50 and the vacuum interrupter 12 in transverse cross section are substantially the same.

The annular design of the body 26 of the lower terminal 20 creates a large heat-transfer surface, increasing heat dissipation from the vacuum interrupter 12 and other components of the circuit breaker 10. Heat transfer is facilitated by low thermal resistance between the terminals 18, 20 and the polymer material forming the body 22 into which the terminals are incorporated. This results in relatively high heat dissipation and increased the current rating of the circuit breaker 10 for given circuit breaker dimensions.

Figure 5:
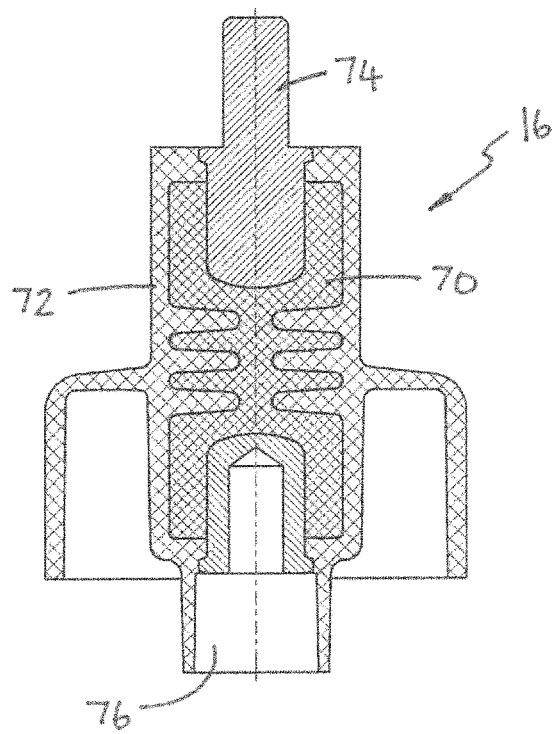
FIG. 5 is a sectioned side view of a preferred insulating pulling rod for use in said vacuum circuit breaker.

FIG. 5 shows the preferred pulling rod 16. To reduce weight and cost, it is preferred to make the pulling rod 16 from plastics materials rather than, for example, metal. The pulling rod 16 must exhibit sufficiently high mechanical and electrical characteristics to suit the operation of the circuit breaker 10. However, the maximum thickness provided by standard single-layer injection molding method is approximately 5 mm, which is not well suited to providing the required mechanical and electrical characteristics. In preferred embodiments, therefore the pulling rod 16 comprises an inner part 70, or core, encased within an outer layer 72, or shell, each being formed from a plastics material (preferably a thermoplastic or thermosetting polymer). Advantageously, the core 70 and shell 72 are formed from different plastics materials. Preferably, the core 70 is formed from a heat-resistant thermoplastic or thermosetting polymer and the shell 72 is formed from an impact-proof thermoplastic or thermosetting polymer. The materials are electrically insulating. In preferred embodiments, the core 70 is formed from material, preferably a moldable electrically insulating material, and most preferably plastics, having relatively high heat-resistance compared to the material from which the shell 72 is formed, whereas the shell 72 is formed from material, preferably a moldable electrically insulating material, and most preferably plastics, having relatively high impact-resistance compared to the material from which the core 70 is formed.

Advantageously, the pulling rod 16 may be formed by a multilayer injection molding process. The heat-resistant core 70 provides size stability at high temperatures, while the impact-proof shell 72 provides a relatively high resistance to the cyclic mechanical loads experienced during use. As a result, the pulling rod 16 exhibits sufficient mechanical and electrical characteristics while reducing the manufacturing cost of the pulling rod 16.

One end of the pulling rod 16 may be provided with a mechanical connector 74, preferably formed from a thermoplastic or thermosetting polymer or other electrically insulating material, for coupling the pulling rod 16 to the movable contact of the vacuum interrupter 12 to allow the actuator to move the movable contact. In the illustrated embodiment, part of the connector 74 is embedded in the pulling rod 16, and part projects from the pulling rod 16 for coupling with the movable contact via the connector 60 of the vacuum interrupter 12, which may include a socket for receiving the projecting part. The embedded part may be inserted into a socket in the pulling rod or co-molded with the pulling rod as is convenient. The opposite end of the pulling rod 16 may be provided with a mechanical connector 76, a socket in the illustrated example, for coupling the pulling rod 16 to the actuator.

Referring in particular to FIG. 4, in preferred embodiments the electrical connection device 50 is located within the hollow annular body 26 of the lower terminal 20. Advantageously, all or part of one or more other components of the circuit breaker 10 may be located within the hollow annular body 26 of the lower terminal 20. For example, in the illustrated embodiment, the lower end of the vacuum interrupter 12 and the upper end of the pulling rod 16 are located within the body 26. This overlapping of circuit breaker components along the pole axis P serves to reduce the length of the circuit breaker 10 along the pole axis P and therefore to reduce the overall size of the circuit breaker. The annular body 26 also serves as an electrical shield to any component(s) located within it.

Figure 6:
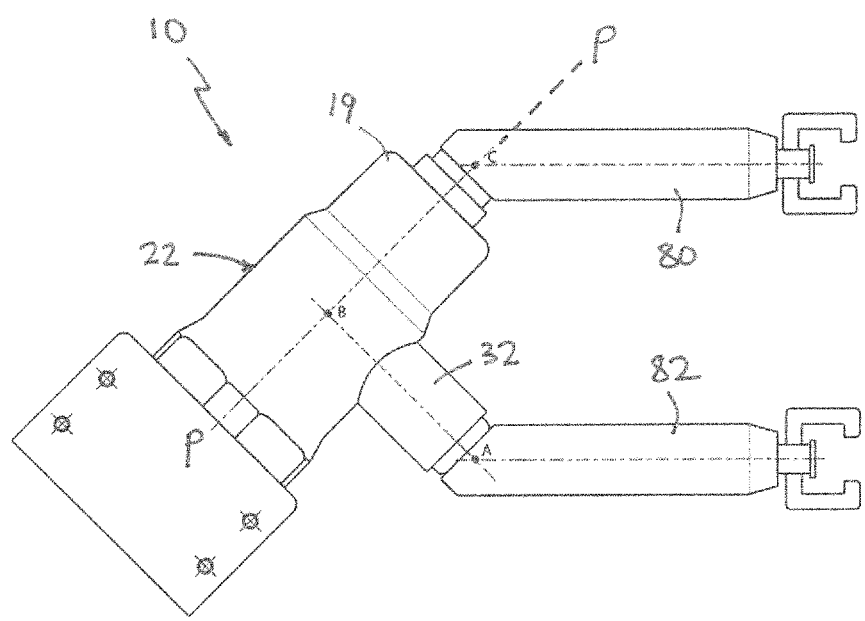
FIG. 6 is a side view of the vacuum circuit breaker including lower and upper terminal connectors.

The resulting compact dimensions between the upper and lower terminals 18, 20 can be too small to fit existing draw-out types of switchgear (not shown). However, the preferred configuration of the upper and lower terminals facilitates connection of the circuit breaker 10 to an external device (e.g. draw-out switchgear) having a spacing between its terminals that is greater than the distance between the exposed ends 34, 44 of the upper and lower terminals 18, 20 measured along the pole axis. The upper terminal 18 is located at the top of the body 22 such that the connection interface (or connection point) provided by its exposed end 44 is also at the top of the body, preferably located on the pole axis P. The exposed end 44 typically has a connection face that is perpendicular to the pole axis P. The upper terminal connection interface is indicated by the letter C in FIG. 6. The stem 32 of the lower terminal 20 projects non-parallely, preferably perpendicularly, from the pole axis P such that the connection interface (or connection point) provided by its exposed end 34 is laterally displaced from the pole axis P. The exposed end 34 typically has a connection face that is perpendicular to the stem's longitudinal axis. The lower terminal connection interface is indicated by the letter A in FIG. 6. A notional perpendicular axis (or straight line) from A to the pole axis P (which corresponds to the longitudinal axis of the stem 32 in preferred embodiments) intersects the pole axis P at point B (which may be described as notional). The shortest linear distance between A and C is greater than the shortest linear distance between C and B (along the pole axis P). The preferred configuration is that a notional triangle created by points A, B and C (i.e. where A, B and C are the apexes of the triangle, and where points A and C may be taken as a point, e.g. a central point, at the respective lower and upper connection interface) is an isosceles right triangle, where a notional (straight) line between points A and C forms the hypotenuse of the triangle. In alternative embodiments, the triangle may be an isosceles triangle but not necessarily an isosceles right triangle. By disposing the circuit breaker 10 with respect to the external device such that the pole axis P is obliquely disposed with respect to a relevant axis of the external device (e.g. the draw-out axis of a draw-out switchgear apparatus) the relevant spacing between the connection interfaces A, C is increased (in comparison to the distance from C to B).

A respective elongate external connector 80, 82, typically comprising an electrically conductive bar, bus or other electrical conductor, may be connected in use to each terminal 18, 20 at the respective connection interface C, A. Preferably, the connectors 80, 82 (more particularly their respective longitudinal axis) extend parallel to each other but obliquely to the pole axis P. The connectors 80, 82 may have a connection (or end) face (for connection with the exposed ends 44, 34) that is obliquely disposed with respect to the longitudinal axis of the connector 80, 82. Points A and C may be centrally located on the respective connection face. The preferred configuration described above, in particular the creation of the notional isosceles triangle, allows the connectors 80, 82 to be identical, or substantially identical, which reduces the overall cost of the system of which the circuit breaker is part.

For example in an electrical switchgear installation (not illustrated), provided that the circuit breaker 10 is inclined to the draw-in and out axis, the terminal distance (C to A) for a particular application can be increased up to the length of the hypotenuse of the right isosceles triangle created by three points: the upper terminal connection interface C; the lower terminal connection interface A; and the point of pole axis P and lower terminal axis intersection B.

The preferred circuit breaker body 22 can be arranged to provide the isosceles triangle between the upper and lower terminal connection interfaces/points. In some applications, including draw-out applications, this allows the same design of both upper and lower current-carrying bars 80, 82 that are connected to the circuit breaker in use. This provides a manufacturing cost reduction due to less nomenclature and fewer different components.

It will be understood that circuit breakers embodying the invention need not necessarily be used with the isosceles triangle installation arrangement described above and illustrated in FIG. 6. For example they may be used in installations where the current-carrying bars, or equivalent connectors, extend perpendicularly to the pole axis P. Similarly, the isosceles triangle installation arrangement described above and illustrated in FIG. 6 may be used with conventional circuit breakers (not illustrated) and is not restricted to use with the circuit breaker 10 described herein.

Advantages provided by preferred embodiments of the invention over conventional circuit breakers include: relatively low weight and small size of the circuit breaker and draw-out installations for given current and insulation ratings; or relatively high values of current and insulation ratings of the circuit breaker and draw-out installations for given circuit breaker dimensions. These lead to decreased costs and suitability for use in dimensionally constrained applications.

Further, any one or more of the electrical connection device 50, the vacuum interrupter 12 and the pulling rod 16 are completely or partially located within the body 26 of the lower terminal 20. This has the effect of shielding the electric field of these components, resulting in a relatively high dielectric strength between the lower terminal 20 and the earthed circuit breaker base, as will as allowing a reduction in the overall dimensions of the circuit breaker 10.

It is also advantageous that the circuit breaker 10 can be assembled after formation of the body 22. The vacuum interrupter 12 is first inserted into the chamber 24 through the lower terminal 20, then the current pickup 50 is inserted into the chamber 24 and is coupled to the moving part 52 of the vacuum interrupter 12, and pressed into the inner face of the lower terminal. This simplifies the production of the circuit breaker, reducing manufacturing cost.

The combination of the design of the pulling rod 16 and the insulating body 22 increases the dielectric strength of the circuit breaker 10. It also improves reliability and structural strength of the construction. Moreover, the terminals 18, 20 embedded in the polymer body 22 act as efficient heat sinks, which makes it possible to increase rated currents, for given dimensions.

The invention is not limited to the embodiment(s) described herein but can be amended or modified without departing from the scope of the present invention.

The invention claimed is:

1. A vacuum circuit breaker comprising:
   a first terminal;
   a second terminal;
   a vacuum interrupter coupled between said first and second terminals and being operable to make or break an electrical connection between said first and second terminals; and
   a body formed from electrically insulating material and being shaped to define an internal chamber,
   wherein said first and second terminals are supported by said body and are spaced apart along a pole axis of the body, and said vacuum interrupter is located in said internal chamber, wherein the first terminal is located at a top of the body and provides a first electrical connection interface at the top of the body, the second terminal including a stem projecting non-parallely from said pole axis to provide a second electrical connection interface that is laterally displaced from the pole axis, and wherein a notional perpendicular axis from the second electrical connection interface to the pole axis intersects the pole axis at an intersection point, a configuration of the circuit breaker being such that a notional triangle created by said first and second electrical connection interfaces and said intersection point is an isosceles triangle, wherein a notional line between said first and second electrical connection interfaces forms a hypotenuse of the triangle, and wherein a first elongate external connector is connected to the first terminal at the first electrical connection interface, and a second elongate external connector is connected to the second terminal at the second electrical connection interface, wherein the external connectors extend parallel to each other but obliquely to the pole axis.

2. The circuit breaker of claim 1, wherein said triangle is an isosceles right triangle.

3. The circuit breaker of claim 1, wherein said first electrical connection interface is provided on the pole axis of the body.

4. The circuit breaker of claim 1, wherein said stem projects perpendicularly from the pole axis.

5. The circuit breaker of claim 1 wherein the external connectors are of an equal length.

6. The circuit breaker of claim 1, wherein each of said external connectors comprises an electrically conductive bar, bus or other electrical connector.

7. The circuit breaker of claim 1, wherein the first and second elongate external connectors are identical, or substantially identical.

8. The circuit breaker of claim 1, wherein said first terminal comprises an end face that is perpendicular to said pole axis.

9. The circuit breaker of claim 1, wherein said second terminal comprises an end face that is perpendicular to a longitudinal axis of said stem.

10. The circuit breaker of claim 1, wherein the second terminal comprises a hollow body that forms part of said internal chamber and which is shaped and dimensioned to allow the vacuum interrupter to pass through it.

11. The circuit breaker of claim 1, wherein said body is formed from a moldable material and wherein at least one of said first terminal and said second terminal are molded into said circuit breaker body.

12. The circuit breaker of claim 1, wherein the circuit breaker body is formed from plastics.

13. The circuit breaker of claim 1 wherein said body has an annular internal surface that forms part of an internal surface of said internal chamber.

14. The circuit breaker of claim 1, wherein said first and second terminals are spaced apart along the pole axis of said circuit breaker body, said vacuum interrupter being at least partly located in a first region of said internal chamber between said first and second terminals.

15. The circuit breaker of claim 14, wherein a transverse cross-section of a second region of said internal chamber defined by said second terminal is shaped and dimensioned to match a transverse cross-sectional shape and dimensions of transverse cross-section of said first region in which the vacuum interrupter is at least partly located, or to define a space that is larger than the transverse cross-sectional shape and dimensions of said first region in which the vacuum interrupter is at least partly located.

16. The circuit breaker of claim 1, wherein the internal chamber is shaped and dimensioned to allow passage of the vacuum interrupter along the internal chamber from an open end of the internal chamber to a desired location within the internal chamber.

17. The circuit breaker of claim 1, further including an electrical connector device electrically connecting a movable contact of the vacuum interrupter to the second terminal, the electrical connector device being located within the internal chamber of the circuit breaker body and wherein the internal chamber is shaped and dimensioned to allow passage of the connector device along the internal chamber from an open end of the internal chamber to a desired location within the internal chamber.

18. The circuit breaker of claim 1 further including a pulling rod coupled to said vacuum interrupter for operation thereof, said pulling rod comprising a core located within a shell, the core being formed from heat-resistant material, the shell being formed from impact resistant material.

19. The circuit breaker of claim 18, wherein the core and the shell are formed from thermoplastics or thermosetting polymeric material.

20. The circuit breaker of claim 18, wherein the core is formed from material having relatively high heat-resistance compared to the material from which the shell is formed, the shell being formed from material having relatively high impact-resistance compared to the material from which the core is formed.

21. The circuit breaker of claim 18, wherein the core and the shell are co-molded with one another.

22. The circuit breaker of claim 18, wherein an end of said pulling rod is located within a hollow body provided by the second terminal.

* * * * *